May 12, 1953  K. BROOK ET AL  2,638,227
FILTER FOR USE IN FUEL INJECTION PUMPS
Filed Feb. 20, 1948

Inventors
K. Brook
F. M. Evans

UNITED STATES PATENT OFFICE 2,638,227

FILTER FOR USE IN FUEL INJECTION PUMPS

Kenneth Brook, Eastcote, and Fraser Mackie Evans, London, England, assignors to C. A. V. Limited, London, England Application February 20, 1948, Serial No. 9,656
In Great Britain February 22, 1947

3 Claims. (Cl. 210—164)

This invention relates to fuel injection pumps of the reciprocatory plunger type for internal combustion engines. In the specification of co-pending application No. 6,208, which was filed on February 4, 1948, we have described an invention which has for its object to enable a filter to be combined with such a pump in a compact and convenient manner. The said invention comprises a pump having at one side of its body, a chamber adapted to accommodate a filter of the type consisting of a pack of laminar elements, the said chamber being closed by a removable hollow cover which serves also to hold in position a partition which carries the filter pack.

In the further development of the said invention we have devised an improvement which forms the subject of the present specification.

Figures 1, 2:
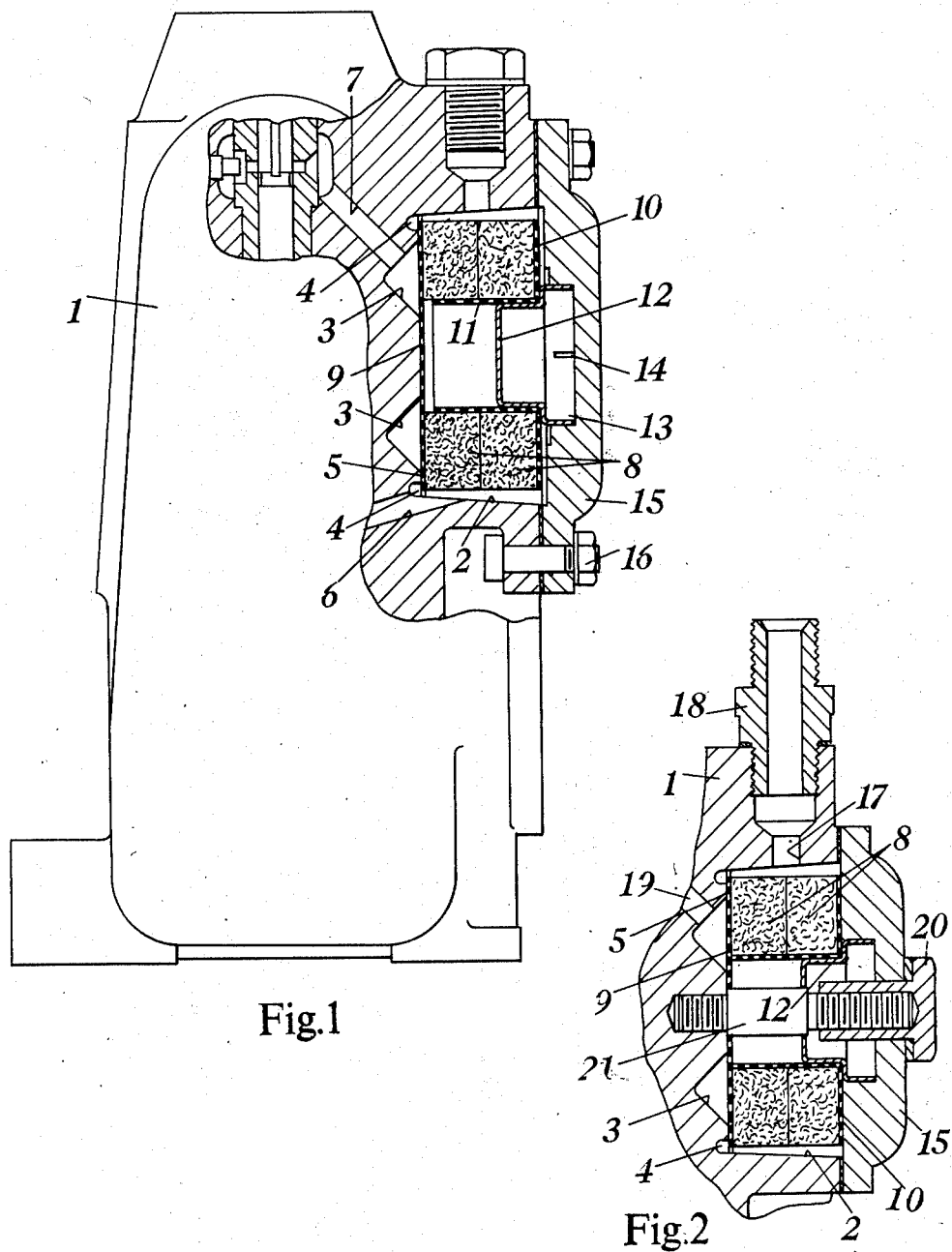
Figure 1 is an elevation of a fuel injection pump for internal combustion engines, shown partly in section, provided with a filter constructed in accordance with the invention.
Figure 2 is a sectional elevation of a modified arrangement of the filter.

In carrying the invention into effect according to one convenient mode as illustrated in Figure 1, the body 1 of a fuel injection pump of the reciprocatory plunger type for internal combustion engines has formed in one side thereof a chamber 2 of any convenient size. This chamber may conveniently be rectangular. The base of the chamber is shaped to provide a seating for supporting the rear face of the filter at or near its outer periphery, by the formation of grooves 3 and 4 which may be circular and afford an annular seating 5. Also the body 1 is formed with an inlet passage 6 leading to the chamber at the outer side of the seating 5 and an outlet passage 7 leading from the chamber at the inner side of the seating.

The filter comprises an annular pad of felt or other suitable porous material and as shown there are two pads 8 placed in contact with one another. These pads have a central circular hole and in external shape may be square or round as desired. They are reinforced by a perforated metal plate 9 at the rear of the pads and a second perforated plate 10 bearing against the outer face of the filter and having a perforated boss 11 extending into the central hole in the filter pads. A hollow metal cap 12 is secured in the boss 11 and has an enlarged head 13 slotted at 14 which is sprung into a recess in a cover 15 removably secured to the body 1 by bolts 16. The filter is thus held in position by and may be removed with the cover, but is itself readily removable from the latter.

The arrangement is such that liquid fuel can enter along the inlet passage to the part of the chamber around the filter pads, and after passing to the hollow centre of the filter can flow out through the outlet passage to the pump cylinder or cylinders.

In the modified arrangement illustrated in Figure 2, the body 1 has a chamber 2 the base of which is provided with grooves 3 and 4 to afford a seating 5 as in the previously described example. The inlet passage 17 communicates with the screwed connection 18 and the outlet passage is at 19. The filter pads 8 are provided with perforated reinforcing metal plates 9 and 10 and the latter is secured to a metal cap 12 which is sprung into a recess in a cover 15 as in the previous example. This cover is secured in place by a single nut 20 threaded on a stud 21 secured in the body. The filter operates in the same manner as in the previously described example and is removable with the cover 15 after unscrewing the nut 20.

By the above described improvement we are able to effect an advantageous simplification of the invention claimed in the previous specification above mentioned.

Having thus described our invention what we claim as new and desire to secure by Letters Patent is:

1. A filter comprising in combination a chamber having one side shaped to provide an annular seating, a removable cover closing the side of said chamber remote from said seating, a porous pad provided with a central hole and arranged in said chamber with one end supported by said annular seating, an inlet communicating with the interior of said chamber at one side of said annular seating, an outlet communicating with the interior of said chamber at the other side of said annular seating, a perforated metal reinforcing plate secured in contact with the face of said pad nearest to said cover and provided with a perforated hollow boss which extends into the central hole in said pad, and means connecting said reinforcing plate to said cover.

2. A filter comprising in combination a chamber having one side shaped to provide an annular seating, a removable cover closing the side of said chamber remote from said seating and having a recess in its inner side, a porous pad provided with a central hole and arranged in said chamber with one end supported by said annular seating, an inlet communicating with the interior of said chamber at one side of said annular seating, an outlet communicating with the interior of the chamber at the other side of said annular seating, a perforated metal reinforcing plate secured in contact with the face of said pad nearest to said cover and provided with a perforated hollow boss which extends into the central hole in said pad, and a hollow cap secured in said hollow boss and having an enlarged head sprung into the recess in the inner side of said cover for removably connecting said pad to said cover.

3. A filter comprising in combination a chamber having one side shaped to provide a central and an annular seating, and an annular recess therebetween, and a perforated plate supported on said central and annular seatings, a removable cover closing the side of said chamber remote from seating, a porous pad provided with a central hole and arranged in said chamber with one end supported by said perforated plate, an inlet communicating with the interior of said chamber at the outside of said annular seating, an outlet communicating with said annular recess, a perforated metal reinforcing plate secured in contact with the face of said pad nearest to said cover and provided with a perforated hollow boss which extends into the central hole in said pad, and means connecting said reinforcing plate to said cover.

KENNETH BROOK.
FRASER MACKIE EVANS.

References Cited in the file of this patent

UNITED STATES PATENTS

| Number | Name | Date |
|---|---|---|
| Re. 22,238 | Clements | Dec. 22, 1942 |
| 1,729,027 | Brennan | Sept. 24, 1929 |
| 2,018,207 | Giambertoni | Oct. 22, 1935 |
| 2,105,626 | Williams | Jan. 18, 1938 |
| 2,139,894 | High | Dec. 13, 1938 |
| 2,286,302 | Parsons | June 16, 1942 |
| 2,357,870 | Beeh | Sept. 12, 1944 |
| 2,376,856 | Hatch | May 29, 1945 |

FOREIGN PATENTS

| Number | Country | Date |
|---|---|---|
| 581,277 | Great Britain | of 1946 |